US007862785B2

(12) United States Patent
Seelmann-Eggebert et al.

(10) Patent No.: US 7,862,785 B2
(45) Date of Patent: Jan. 4, 2011

(54) USE OF SURFACTANTS IN THE PRODUCTION OF METAL

(75) Inventors: Hans-Peter Seelmann-Eggebert, Limburgerhof (DE); Guenter Oetter, Frankenthal (DE); Carlos Rene Ponce Brodersen, Colina (CL); Ricardo Daniel Lopez Lopez Pinochet, La Reina (CL); Arturo Berastain, Lima (PE)

(73) Assignee: BASF Aktiengesellschaft, Ludwigshafen (DE)

( * ) Notice: Subject to any disclaimer, the term of this patent is extended or adjusted under 35 U.S.C. 154(b) by 411 days.

(21) Appl. No.: 11/722,766

(22) PCT Filed: Dec. 23, 2005

(86) PCT No.: PCT/EP2005/014004

§ 371 (c)(1),
(2), (4) Date: Jun. 25, 2007

(87) PCT Pub. No.: WO2006/069760

PCT Pub. Date: Jul. 6, 2006

(65) Prior Publication Data

US 2008/0025890 A1    Jan. 31, 2008

(30) Foreign Application Priority Data

Dec. 24, 2004   (DE)   .................. 10 2004 063 500

(51) Int. Cl.
*C01G 3/00*   (2006.01)
(52) U.S. Cl. ............................. 423/23; 423/1
(58) Field of Classification Search .................. 423/23, 423/1
See application file for complete search history.

(56) References Cited

U.S. PATENT DOCUMENTS 4,045,084 A    8/1977   Hsueh et al.
4,080,419 A    3/1978   Engelmann

FOREIGN PATENT DOCUMENTS

| DE | 102 43 365 | 4/2004 |
|---|---|---|
| EP | 0 536 914 | 4/1993 |
| GB | 1 567 765 | 5/1980 |
| WO | 92 17614 | 10/1992 |

OTHER PUBLICATIONS

Fathi Habashi, "Handbook of Extractive Metallurgy", Wiley-VCH, vol. II, XP 002375391, pp. 525-529, 1997.
Kurt Kosswig, et al., "Interfacial Phenomena", Ullmann's Encyclopedia of Industrial Chemistry, Wiley-VCH, XP 002375392, (Online), URL:www.mrw.interscience.wiley.com/ueic/articles/a25-747/sect1.html>, pp. 1-5, 2000.
Kurt Kosswig, et al., "Overview of Surfactants", Ullmann's Encyclopedia of Industrial Chemistry, Wiley-VCH, XP 002375393, (Online), URL:www.mrw.interscience.wiley.com/ueic/articles/a25-747/sect2.html>, pp. 1-3, 2000.
Ullmann's Encyclopedia of Industrial Chemistry, "Anionic Surfactants", Wiley-VCH, XP 002375394, (Online), URL:www.mrw.interscience.wiley.com/ueic/articles/a25-747/sect6.html>, 2000.
Kurth Kosswig, et al., "Nonionic Surfactants", Ullmann's Encyclopedia of Industrial Chemistry, Wiley-VCH, XP 002375395, (Online), URL:www.mrw.interscience.wiley.com/ueic/articles/a25-747/sect7.html>, pp. 1-14, 2000.
Ullmann's Encyclopedia of Industrial Chemistry, "Cationic Surfactants", Wiley-VCH, XP 002375396, (Online), URL:www.mrw.interscience.wiley.com/ueic/articles/a25-747/sect8.html>, 2000.
Ullmann's Encyclopedia of Industrial Chemistry, "Amphoteric Surfactants", Wiley-VCH, XP 002375397, (Online), URL:www.mrw.interscience.wiley.com/ueic/articles/a25-747/sect9.html>, 2000. (Abstract).
Ullmann's Encyclopedia of Industrial Chemistry, "Surfactants With Heteroatoms in the Hydrophobic Group", Wiley-VCH, XP 002375398, (Online), URL:www.mrw.interscience.wiley.com/ueic/articles/a25-747/sect10.html>, 2000.

*Primary Examiner*—Melvin C Mayes
*Assistant Examiner*—Melissa Stalder
(74) *Attorney, Agent, or Firm*—Oblon, Spivak, McClelland, Maier & Neustadt, L.L.P.

(57) ABSTRACT

An aqueous sulfuric acid-containing composition which comprises at least one surfactant, and a process for extricating metal from metal-containing materials with the aid of this aqueous sulfuric acid-containing composition are described.

11 Claims, No Drawings

USE OF SURFACTANTS IN THE PRODUCTION OF METAL

The present invention relates to an aqueous sulfuric, acid-containing composition which comprises at least one surfactant, and to a process for extracting metals from metal-containing materials with the aid of this aqueous sulfuric acid-containing composition.

The present invention is suitable, for example, for extracting copper.

Copper (Cu) is present as a noble metal in relatively small amounts in elemental form in North America, Chile and Australia. In the bound state, it occurs only cationically in the form of oxides, sulfides, arsenides, chlorides and carbonates according to its metallic character. The most important sulfidic copper ores are: chalkopyrite $CuFeS_2$(="$Cu_2S \cdot Fe_2S_3$"), peacock ore (bornite) $Cu_3 FeS_3$(="$3Cu_2S \cdot Fe_2S_3$"), cubanite $CuFe_2S_3$ and copper glance (chalcocite) $Cu_2S$. Among the oxidic ores, red copper ore (cuprite) $Cu_2O$, the green malachite $Cu_2(OH)_2(CO_3)$ (="$CuCO_3 \cdot Cu(OH)_2$") and blue copper ore (azurite) $Cu_3(OH)_2(CO_3)_2$ (="$2CuCO_3 \cdot Cu(OH)_2$") may be mentioned. Particularly rich deposits of copper ores are to be found in the USA, in Canada, in Asiatic Russia, in Chile, in the Congo region and in Zimbabwe.

Copper yields are obtained from copper-rich starting materials, preferably by flotation. In contrast, flotation is not suitable for starting material having small proportions of copper.

Crude copper is obtained from copper-poor ores and waste products (Cu content <2%), for example the copper-containing pyrite calcination products obtained in sulfuric acid production, expediently by a wet method, by treating these starting materials—if necessary after prior roasting—with dilute sulfuric acid, and extracting the copper from the resulting copper sulfate solution by further working-up steps.

Usually, the extraction of the copper is effected in such a way that the copper-containing material is formed into a heap and then sprayed from above with dilute sulfuric acid so that the dilute sulfuric acid can percolate or trickle through the copper-containing containing material. The mother liquor enriched with copper collects at the bottom of the heap and is fed to the further working-up stage.

The working-up of the aqueous copper-containing mother liquor thus obtained is effected in general by extracting the copper from the aqueous solution into an organic solution, with subsequent further extraction by sulfuric acid and electrolytic deposition.

The yields in this process for extracting copper are—independently of the usually low copper content in the starting materials—generally low. In order to increase the yield in the copper extraction, the prior art describes the addition of surfactants to the dilute sulfuric acid.

U.S. Pat. No. 4,045,084 describes a process for the in situ extraction of copper and nickel starting from underground sulfide-containing ores, a two-phase liquor comprising an aqueous phase and a gaseous phase being used. The gaseous phase of the liquor is formed from oxygen-containing bubbles while the aqueous phase contains a surfactant in addition to ammonia and diammonium sulfate. By using the surfactant in the two-phase liquor, it is intended to ensure that the oxygen-containing bubbles remain stable under the conditions of the extraction and at the same time the coalescence of the oxygen-containing bubbles is minimized. For example, Dowfax® 2A1 is mentioned as a preferred surfactant, said surfactant being an anionic sulfonate surfactant.

EP 0 536 914 describes the use of fluoroaliphatic surfactants of the general formula $(Rf)_n(Q)_xZ$, where Rf corresponds to a fluoroaliphatic radical, Q corresponds to a linking unit and Z corresponds to a water-soluble group, in the extraction of copper (n is 1 or 2 and x is 0 or 1). Moreover, the European patent states that, in addition to the fluoroaliphatic surfactants, further surfactants are suitable for the copper extraction since other hydrocarbon-containing surfactants either would not have a sufficient effect or be unstable under the acidic conditions of the extraction.

However, the large amounts of sulfuric acid which are required for separating the copper from the copper-containing material, and the generally unsatisfactory yield of copper during the extraction, which is usually not more than 80%, are disadvantageous. Furthermore, the extraction requires a considerable amount of time of from a few days to a few months.

It is therefore the object to provide a composition and a process for extracting metals from corresponding metal-containing materials which preferably make it possible to increase the yields of metal, based on the metal-containing material used. Moreover, the composition or the process should preferably lead to a reduction in the required duration of extraction and the amount of sulfuric acid required for extraction. Furthermore, the composition should preferably not comprise any substances which could interfere with the working-up of the metal-containing extract.

The object is achieved by an aqueous composition which comprises sulfuric acid and at least one surfactant.

In the composition, the surfactant, in a concentration of from 0.01 to 0.3% by weight, particularly preferably from 0.05 to 0.25% by weight, in particular from 0.1 to 0.2% by weight in a 2% strength aqueous $H_2SO_4$ solution, at 23° C., leads to a reduction in the contact angle on glass after 1 second, particularly preferably after 0.5 second, in particular after 0.1 second, by at least 10°, particularly preferably at least 20°, in particular at least 30°, especially at least 40°.

According to the invention, it was found that, when used in very low concentrations, the surfactant systems described favor the kinetics of the extraction, increase the metal yield and make it possible to reduce the amount of sulfuric acid used.

The composition according to the invention is suitable for extracting any metal which can be dissolved out of the corresponding starting materials, for example ores, rock or minerals, on treatment with sulfuric acid. Examples of this are the nonferrous metals copper, nickel, lead, zinc, cobalt, antimony, mercury and bismuth, in particular copper.

In a preferred embodiment of the present invention, the resulting aqueous composition comprising the surfactant has a contact angle on glass of less than 40°, particularly preferably less than 30°, in particular less than 20°.

The contact angle is measured on an extra-white glass slide from Gerhard Menzel Glasbearbeitungswerk GmbH & Co. KG, Braunschweig, having a slide thickness of 1 mm. The approximate composition of the glass slide is as follows:

Approximate Chemical Composition

| | | |
|---|---|---|
| Silicon dioxide | $SiO_2$ | 72.20% |
| Sodium oxide | $Na_2O$ | 14.30% |
| Potassium oxide | $K_2O$ | 1.20% |
| Calcium oxide | $CaO$ | 6.40% |
| Magnesium oxide | $MgO$ | 4.30% |
| Aluminum oxide | $Al_2O_3$ | 1.20% |
| Iron oxide | $Fe_2O_3$ | 0.03% |
| Sulfur trioxide | $SO_3$ | 0.30% |

Other Properties of the Glass are as Follows:

| Mean coefficient of expansion (20-300°) | $90.6 \times 10^{-7}$/° C. |
|---|---|
| Expansion point log n 14.5 | 513° C. |
| Littleton softening point | 720° C. |

Radiation of Second Mirror Surface:

Total solar reflection (M=2) as a proportion of the normal reflection of a second mirror surface at solar elevation of 30°:95.3%.

Light Transmittance:

Total solar transmittance (M=2) as a proportion of the normal transmittance at solar elevation of 30°:91.6%

Refractive Index

| At λ = 546.07 nm | 1.5171 |
|---|---|
| Impermeability | 2.479 |

The glass slide is cleaned with acetone and dried in a drying oven at 70° C. for 2 hours before the measurement of the contact angle.

The surfactant used in the composition according to he invention may be anionic, cationic, nonionic or amphoteric. Mixtures of the above-mentioned surfactant classes may also be used. Preferred surfactants are those which, after extraction of the metal from the metal-containing material, do not adversely affect the further working-up of the extracted metal in the sulfuric acid-containing copper solution, in particular the transfer thereof from the aqueous extraction phase into an organic phase. Suitable surfactant systems must be good wetting agents but poor emulsifiers. In a preferred embodiment of the present invention, the surfactant used is therefore one which substantially does not prolong the time up to establishment of phase separation during the extraction of the aqueous phase with an organic phase in comparison with a phase separation without surfactant.

Suitable surfactants should moreover preferably be stable under the acidic conditions of the sulfuric acid in an aqueous phase and should preferably be biodegradable, particularly preferably readily biodegradable.

If a nonionic surfactant is used in the composition according to the invention, this may be selected from the group consisting of alcohol alkoxylates, alkylphenol alkoxylates, alkylpolyglucosides, N-alkylpolyglucosides, N-alkylglucamides, fatty acid alkoxylates, fatty acid polyglycol ester, fatty acid amine alkoxylates, fatty acid amide alkoxylates, fatty acid alkanolamide alkoxylates, N-alkoxypolyhydroxy-fatty acid amides, N-aryloxypolyhydroxy-fatty acid amides, block copolymers of ethylene oxide, propylene oxide and/or butylene oxide, polyisobutene alkoxylates, polyisobutene/maleic anhydride derivatives, fatty acid glycerides, sorbitan esters, polyhydroxy-fatty acid derivatives polyalkoxy-fatty acid derivatives and bisglycerides.

Suitable Nonionic Surfactants are in Particular:

alkoxylated $C_4$- to $C_{22}$-alcohols, such as fatty alcohol alkoxylates or oxo alcohol alkoxylates. These may be alkoxylated with ethylene oxide, propylene oxide and/or butylene oxide. Surfactants which may be used here are all alkoxylated alcohols which comprise at least two added molecules of one of the abovementioned alkylene oxides. Block polymers of ethylene oxide, propylene oxide and/or butylene oxide or adducts which comprise said alkylene oxides in random distribution are suitable here. The nonionic surfactants generally comprise from 2 to 50, preferably from 3 to 20, mole of at least one alkylene oxide per mole of alcohol. they preferably comprise ethylene oxide as alkylene oxide. The alcohols preferably have 10 to 18 carbon atoms. Depending on the type of alkoxylation catalyst used in the preparation, on the type of preparation process and on the method working up, the alkoxylates have a broad or narrow alkylene oxide homolog distribution;

alkylphenol alkoxylates, such as alkylphenol ethoxylates having $C_6$- to $C_{14}$-alkyl chains and from 5 to 30 alkylene oxide units;

alkylpolyglucosides having 8 to 22, preferably 10 to 18, carbon atoms in the alkyl chain and in general 1 to 20, preferably 1.1 to 5, glucoside units;

sorbitan alkanoates, including in alkoxylated form;

N-alkylglucamides, fatty acid alkoxylates, fatty acid amine alkoxylates, fatty acid amide alkoxylates, fatty acid alkanolamide alkoxylates, block copolymers of ethylene oxide, propylene oxide and/or butylene oxide, polyisobutene ethoxylates, polyisobutene/maleic anhydride derivatives, optionally alkoxylated monoglycerides, glyceryl monostearates, sorbitan esters and bisglycerides.

Particularly suitable nonionic surfactants are alkyl alkoxylates or mixtures of alkyl alkoxylates, as described, for example, in DE-A 102 43 363, DE-A 102 43 361, DE-A 102 43 360, DE-A 102 43 365, DE-A 102 43 366, DE-A 102 43 362 or DE-A 43 25 237. These are alkoxylation products which were obtained by reaction of alkanols with alkylene oxides in the presence of alkoxylation catalysts or are mixtures of alkoxylation products. Particularly suitable initiator alcohols are the so-called Guerbet alcohols, in particular ethylhexanol, propylheptanol and butyloctanol. Propylheptanol is particularly preferred. Preferred alkylene oxides are propylene oxide and ethylene oxide, alkyl alkoxylates having a direct link of a preferably short polypropylene oxide block to the initiator alcohol, as described in DE-A 102 43 365, for example, being preferred in particular because of their low residual alcohol content and their good biodegradability.

In a preferred embodiment of the present invention, alcohol alkoxylates of the general formula (I)

$$R^1\text{—O—}(CH_2\text{—}CHR^5\text{—O—})_r(CH_2\text{—}CH_2\text{—O—})_n \\ (CH_2\text{—}CHR^6\text{—O—})_s(CH_2\text{—}CHR^2\text{—O—})_mH \qquad (I)$$

where $R^1$ is at least singly branched $C_{4-22}$-alkyl or -alkylphenol, $R^2$ is $C_{3-4}$-alkyl $R^5$ is $C_{1-4}$-alkyl $R^6$ is methyl or ethyl n has a mean value of from 1 to 50 m has a mean value of from 0 to 20, preferably from 0.5 to 20 r has a mean value of from 0 to 50, s has a mean value of from 0 to 50, m being at least 0.5 if $R^5$ is methyl or ethyl or r has the value 0, are used.

A mixture of from 20 to 95% by weight, preferably from 30 to 95% by weight, of at least one alcohol alkoxylate above and from 5 to 80% by weight, preferably from 5 to 70% by weight, of a corresponding alcohol alkoxylate in which $R^1$ is, however, a straight-chain alkyl radical having the same number of carbon atoms is furthermore possible.

Alcohol alkoxylates of the general formula (II)

$$R^3-O-(CH_2-CH_2-O)_p(CH_2-CHR^4-O-)_qH \quad (II)$$

where

R$^3$ is branched or straight-chain C$_{4-22}$-alkyl or -alkylphenol

R$^4$ is C$_{3-4}$-alkyl p has a mean value of from 1 to 50, preferably from 4 to 15 q has a mean value of from 0.5 to 20, preferably from 0.5 to 4, more preferably from 0.5 to 2, are furthermore possible.

A mixture of from 5 to 95% by weight of at least one branched alcohol alkoxylate (II), as described immediately above, and from 5 to 95% by weight of a corresponding alcohol alkoxylate in which, however, a straight-chain alkyl radical is present instead of a branched alkyl radical is furthermore possible.

In the alcohol alkoxylates of the general formula (I), R$^2$ is preferably propyl, in particular n-propyl.

In the alcohol alkoxylates of the general formula (II), n preferably has a mean value of from 4 to 15, particularly preferably from 6 to 12, in particular from 7 to 10.

m preferably has a mean value of from 0.5 to 4, particularly preferably from 0.5 to 2, in particular from 1 to 2. The expression "mean value" relates to industrial products in which different numbers of alkylene oxide units may be present in the individual molecules. It describes the proportion of corresponding alkylene oxide units present on average in industrial products. A value of 0.5 therefore means that on average every second molecule carries a corresponding unit. According to a preferred embodiment of the invention, the lower limit 1 replaces the lower limit of 0.5 for the indices n, m, p and q.

r is preferably 0. s is preferably 0.

The radical R$^1$ is preferably a C$_{8-15}$-alkyl, particularly preferably C$_{8-13}$-alkyl, in particular C$_{8-12}$-alkyl radical, which is at least singly branched. A plurality of branches may also be present.

R$^5$ is preferably methyl or ethyl, in particular methyl.

R$^6$ is preferably ethyl.

Compounds having straight-chain and having branched alcohol radicals R$^1$ are present in the mixtures. this is the case, for example, with oxo alcohols which have a proportion of linear and a proportion of branched alcohol chains. For example, a C$_{13/15}$-oxo alcohol frequently has about 60% by weight of completely linear alcohol chains but in addition about 40% by weight of α-methyl-branched and C$_{\geq 2}$-branched alcohol chains.

In the alcohol alkoxylates of the general formula (II), R$^3$ is preferably a branched or straight-chain C$_{8-15}$-alkyl radical, particularly preferably a branched or straight-chain C$_{8-13}$-alkyl radical and in particular a branched or straight-chain C$_{8-12}$-alkyl radical. R$^4$ is preferably propyl, in particular n-propyl. p preferably has a mean value of from 4 to 15, particularly preferably a mean value of from 6 to 12 and in particular a mean value of from 7 to 10. q preferably has a mean value of from 0.5 to 4, particularly preferably from 0.5 to 2, in particular from 1 to 2.

Similarly to the alcohol alkoxylates of the general formula (I), the alcohol alkoxylates of the general formula (II) may also be present as mixtures with straight-chain and branched alcohol radicals.

Suitable alcohol components on which the alcohol alkoxylates are based are not only pure alkanols but also homologous mixtures having a range of carbon atoms. Examples are C$_{8/10}$-alkanols, C$_{10/12}$-alkanols, C$_{13/15}$-alkanols and C$_{12/15}$-alkanols. Mixtures of a plurality of alkanols are also possible.

The above alkanol alkoxylates or mixtures according to the invention are preferably prepared by reacting alcohols of the general formula R$^1$—OH or R$^3$—OH or mixtures of corresponding branched and straight-chain alcohols, if appropriate first with C$_{3-6}$-alkylene oxide, then with ethylene oxide and subsequently, if appropriate, with C$_{3-4}$-alkylene oxide and then with a corresponding C$_{5-6}$-alkylene oxide. The alkoxylations are preferably carried out in the presence of alkoxylation catalysts. In particular, basic catalysts, such as potassium hydroxide, are used. By means of special alkoxylation catalysts, such as modified bentonites or hydrotalcites, as described, for example, in WO 95/04024, the random distribution of the amounts of the incorporated alkylene oxides can be greatly restricted so that narrow-range alkoxylates are obtained.

A further particular embodiment of the present invention relates to alkoxylate mixtures comprising alkoxylates of the general formula (III)

$$C_5H_{11}CH(C_3H_7)CH_2O(B)_p(A)_n(B)_m(A)_qH \quad (III)$$

where

A is ethyleneoxy

B, in each case independently is C$_{3-10}$-alkyleneoxy, preferably propyleneoxy, butyleneoxy, pentyleneoxy or mixtures thereof.

groups A and B being present in the forms of blocks in the stated sequence,

| | |
|---|---|
| p | is a number from 0 to 10 |
| n | is a number greater than 0 to 20 |
| m | is a number greater than 0 to 20 |
| q | is a number greater than 0 to 10 | p+n+m+q is at least 1, from 70 to 99% by weight of alkoxylates A1 in which C$_5$H$_{11}$ has the meaning n–C$_5$H$_{11}$ and from 1 to 30% by weight of alkoxylates A2 in which C$_5$H$_{11}$ has the meaning C$_2$H$_5$CH(CH$_3$)CH$_2$ and/or CH$_3$CH(CH$_3$)CH$_2$CH$_2$ being present in the mixture.

In the general formula (III), p is a number from 0 to 10, preferably from 0 to 5, in particular from 0 to 3. If blocks (B)$_p$ are present, p is preferably a number from 0.1 to 10, particularly preferably from 0.5 to 5, in particular from 1 to 3.

In the general formula (III), n is preferably a number in the range from 0.25 to 10, in particular from 0.5 to 7, m is preferably a number in the range from 2 to 10, in particular from 3 to 6. B is preferably propyleneoxy and/or butyleneoxy, especially propyleneoxy at both positions.

q is preferably a number in the range from 1 to 5, particularly preferably in the range from 2 to 3.

The sum p+n+m+q is a least 1, preferably from 3 to 25, particularly preferably from 5 to 15, in particular from 7 to 13.

Preferably 3 or 4 alkylene oxide blocks are present in the alkoxylates. According to an embodiment, adjacent to the alcohol radical are initially ethyleneoxy units, adjacent thereto propylene oxide units and adjacent thereto ethyleneoxy units. According to a further embodiment, adjacent to the alcohol radical are initially propyleneoxy units, then ethyleneoxy units, then propyleneoxy units and finally ethyleneoxy units. Instead of the propyleneoxy units, the other alkyleneoxy units stated can also be present.

p, n, m and q have a mean value which is an average for the alkoxylates. p, n, m and q may therefore also deviate from integral values. In the alkoxylation of alkanols, a distribution of the degree of alkoxylation which can be adjusted to a certain extent by using different alkoxylation catalysts is generally obtained. Through the choice of suitable amounts of groups A and B, the property spectrum of the alkoxylate mixtures according to the invention can be adapted according to practical requirements.

The alkoxylate mixtures are obtained by alkoxylation of the parent alcohols $C_5H_{11}CH(C_3H_7)CH_2OH$. The starting alcohols can be obtained by mixing the individual components so that the ratio according to the invention results. They can be prepared by aldol condensation of valeraldehyde and subsequent hydrogenation. The preparation of valeraldehyde and the corresponding isomers is effected by hydroformylation of butene, as described, for example, in U.S. Pat. No. 4,287,370; Beilstein E IV 1, 32 68, Ullmanns Encyclopedia of Industrial Chemistry, 5th Edition, Volume A1, pages 323 and 328 et seq. The following aldol condensation is described, for example, in U.S. Pat. No. 5,434,313 and Römpp, Chemie Lexikon, 9th Edition, key work "Aldol-Addition", page 91. The hydrogenation of the aldol condensate follows general hydrogenation conditions.

Furthermore, 2-propylheptanol can be prepared by condensation of 1-pentanol (as a mixture of the corresponding methylbutan-1-ols) in the presence of KOH at elevated temperatures, cf. for example Marcel Guerbet, C. R. Acad Sci Paris 128, 511, 1002 (1899). Furthermore, reference may be made to Römpp, Chemie Lexikon, 9th Edition, Georg Thieme Verlag Stuttgart, and the citations mentioned there, and Tetrahedron, Vol. 23, pages 1723 to 1733.

In the general formula (III), the radical $C_5H_{11}$ may have the meaning $n-C_5H_{11}$, $C_2H_5CH(CH_3)CH_2$ or $CH_3CH(CH_3)CH_2CH_2$. The alkoxylates are mixtures.

from 70 to 99% by weight, preferably from 85 to 96% by weight, of alkoxylates A1 in which $C_5H_{11}$ has the meaning $n-C_5H_{11}$ and from 1 to 30% by weight, preferably from 4 to 15% by weight, of alkoxylates A2 in which $C_5H_{11}$ has the meaning $C_2H_5CH(CH_3)CH_2$ and/or $CH_3CH(CH_3)CH_2CH_2$ being present.

The radical $C_3H_7$ preferably has the meaning $n-C_3H_7$.

The alkoxylation is preferably catalyzed by strong bases which are expediently added in the form of an alkali metal alcoholate, alkali metal hydroxide or alkaline earth metal hydroxide, as a rule in an amount of from 0.1 to 1% by weight, based on the amount of the alkanol $R^2$—OH (cf. G. Gee et al., J. Chem. Soc. (1961), page 1345; B. Wojtech, Makromol. Chem. 66, (1966), page 180).

An acid catalysis of the addition reaction is also possible. In addition to Bronstedt acids, Lewis acids, such as, for example, $AlCl_3$ or $BF_3$ dietherate, $BF_3$, $BF_3 \cdot H_3PO_4$, $SbCl_4 \cdot 2 H_2O$ or hydrotalcite are also suitable (cf. P. H. Plesch, The Chemistry of Cationic Polymerization, Pergamon Press, New York (1963)). Double metal cyanide (DMC) compounds are also suitable as the catalyst.

All suitable compounds known to the person skilled in the art can in principle be used as the DMC compound.

DMC compounds suitable as a catalyst are described, for example, in WO 99/16775 and DE-A-101 17 273. Particularly suitable catalysts for the alkoxylation are double metal cyanide compounds of the general formula (IV):

$$M^1_a[M^2(CN)_b(A)_c]_d \cdot fM^1_gX_n \cdot h(H_2O) \cdot eL \cdot kP \qquad (IV),$$

where
$M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$, and $Ru^{3+}$, $M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Rh^{2+}$, and $Ir^{3+}$, A and X, independently of one another, are an anion selected from the group consisting of halide, hydroxide, sulfate, carbonate, cyanide, thiocyanate, isocyanate, cyanate, carboxylate, oxalate, nitrate, nitrosyl, hydrogen sulfate, phosphate, dihydrogen phosphate, hydrogen phosphate and bicarbonate, L is a water-miscible ligand selected from the group consisting of alcohols, aldehydes, ketones, ethers, polyethers, esters, polyesters, polycarbonate, ureas, amides, primary, secondary and tertiary amines, ligands comprising pyridine nitrogen, nitriles, sulfides, phosphides, phosphites, phosphanes, phosphonates and phosphates, k is a fraction or integer greater than or equal to zero and P is an organic additive, a, b, c, d, g and n are selected so that the electroneutrality of the compound (I) is ensured, it being possible for c to be 0, e, the number of ligand molecules, is a fraction or integer greater than 0 or is 0, f and h, independently of one another, are a fraction or integer greater than 0 or are 0.

The following may be mentioned as organic additives P: polyether, polyester, polycarbonates, polyalkylene glycol sorbitan ester, polyalkylene glycol glycidyl ether, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), maleic acid and maleic anhydride copolymers, hydroxyethylcellulose, polyacetates, ionic surface-active and interface-active compounds, gallic acid or its salts, esters or amides, carboxylic esters of polyhydric alcohols and glycosides.

These catalysts may be crystalline or amorphous. where k is zero, crystalline double metal cyanide compounds are preferred. Where k is greater than zero, crystalline, semicrystalline and substantially amorphous catalysts are preferred.

Among the modified catalysts, there are various preferred embodiments. A preferred embodiment comprises catalysts of the formula (IV) in which k is greater than zero. The preferred catalyst then comprises at least one double metal cyanide compound, at least one organic ligand and at least one organic additive P.

In another preferred embodiment, k is zero, e is optionally also zero and X is exclusively a carboxylate, preferably formate, acetate and propionate. Such catalysts are described in WO 99/16775. In this embodiment, crystalline double metal cyanide catalysts are preferred. Double metal cyanide catalysts as described in WO 00/74845, which are crystalline or lamellar, are furthermore preferred.

The preparation of the modified catalysts is effected by combining a metal salt solution with a cyanometallate solution which may optionally comprise both an organic ligand L and an organic additive P. The organic ligand and optionally the organic additive are then added. In a preferred embodiment of the catalyst preparation, an inactive double metal cyanide phase is first prepared and this is then converted into an active double metal cyanide phase by recrystallization, as described in PCT/EP 01/01893.

In another preferred embodiment of the catalysts, f, e and k are not zero. These are double metal cyanide catalysts which comprise a water-miscible organic ligand (in general in amounts of from 0.5 to 30% by weight) and an organic additive (in general in amounts of from 5 to 80% by weight), as described in WO 98/06312. The catalysts can be prepared either with vigorous stirring (24 000 rpm using a Turrax) or with stirring, as described in U.S. Pat. No. 5,158,922.

Particularly suitable catalysts for the alkoxylation are double metal cyanide compounds which comprise zinc, cobalt or iron or two thereof. For example, Prussian Blue is particularly suitable.

Crystalline DMC compounds are preferably used. In a preferred embodiment, a crystalline DMC compound of the Zn—Co type, which comprises zinc acetate as a further metal salt component, is used as the catalyst. Such compounds are crystallized with a monoclinic structure and have a lamellar habit. Such compounds are described, for example, in WO 00/74845 or PCT/EP01/01893.

DMC compounds suitable as a catalyst can be prepared in principle by all methods known to the person skilled in the art. For example, the DMC compounds cans be prepared by direct precipitation, by the incipient wetness method or by preparation of a precursor phase and subsequent recrystallization.

The DMC compounds can be used as a powder, paste or suspension or can be shaped to give a molding, introduced into moldings, foams or the like or applied to moldings, foams or the like.

The catalyst concentration used for the alkoxylation, based on the final quantity range, is typically less than 2000 ppm (i.e. mg of catalyst per kg of product), preferably less than 1000 ppm, in particular less than 500 ppm, particularly preferably less than 100 ppm, for example less than 50 ppm or 35 ppm, particularly preferably less than 25 ppm.

The addition reaction is carried out at temperatures of from 90 to 240° C., preferably from 120 to 180° C., in a closed vessel. The alkylene oxide or the mixture of different alkylene oxides is added to the mixture of alkanol mixture according to the invention and alkali under the vapor pressure of the alkylene oxide mixture which prevails at the chosen reaction temperature. If desired, the alkylene oxide can be diluted with up to about 30 to 60% of an inert gas. This provides additional safety with regard to prevention of explosive polyaddition of the alkylene oxide.

If an alkylene oxide mixture is used, polyether chains in which the different alkylene oxide building blocks are virtually randomly distributed are formed. Variations in the distribution of the building blocks along the polyether chain are the result of different reaction rates of the components and can also be achieved randomly by continuous feeding of an alkylene oxide mixture of program-controlled composition. If the different alkylene oxides are reacted in succession, polyether chains having a block-like distribution of alkylene oxide building blocks are obtained.

The length of the polyether chains varies randomly within the reaction product about a mean value of the stoichiometric value substantially resulting from the added amount.

Preferred alkoxylate mixtures of the general formula (I) can be obtained by reacting alcohols of the general formula $C_5H_{11}CH(C_3H_7)CH_2OH$ with propylene oxide/ethylene oxide in the abovementioned sequence under alkoxylation conditions. Suitable alkoxylation conditions are described above and in Nikolaus Schönfeldt, Grenzflächenaktive Äthylenox-Addukte, Wissenschaftliche Verlagsgesellschaft mbH Stuttgart 1984. As a rule, the alkoxylation is carried out in the presence of basic catalysts, such as KOH, in the absence of a solvent. The alkoxylation can, however, also be carried out with the concomitant use of a solvent. A polymerization of the alkylene oxide is initiated in which a random distribution of homologs inevitably occurs, the mean value of which is specified here with p, n, m and q.

In the case of a preferred initially performed propoxylation and subsequent ethoxylation, the content of residual alcohol in the alkoxylates can be reduced since propylene oxide undergoes addition more uniformly at the alcohol component. In contrast, ethylene oxide reacts preferentially with ethoxylates, so that, when ethylene oxide is used initially for the reaction with the alkanols, a broader homolog distribution may result. The alcohol mixtures used according to the invention have, as a rule, a natural odor which can be very substantially suppressed by the complete alkoxylation.

The alkoxylate mixtures according to the invention require only one propylene oxide (PO) block of very short length, preferably directly bonded to the alcohol, in order to reduce the residue alcohol content. This is in particular very advantageous because the biodegradability of the product decreases on lengthening the PO block. Such alkoxylate mixtures therefore permit maximum degrees of freedom in the choice of the length of the PO block, the lower limit of the length being determined by the increase in residue alcohol content and the upper limit by the deterioration in the biodegradability.

Furthermore, block-like isotridecanol alkoxylates of the general formula (V)

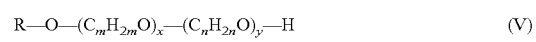

$$R—O—(C_mH_{2m}O)_x—(C_nH_{2n}O)_y—H \qquad (V)$$

may be present, where

R is an isotridecyl radical, m is the number 2 and at the same time n is the number 3 or 4 or m is the number 3 or 4 and at the same time n is the number 2 and x and y, independently of one another, are numbers from 1 to 20, the variable x being greater than or equal to y where m=2/n=3 or 4.

These block-like isotridecal alkoxylates are described, for example, in DE 196 21 843 A1, the entire disclosure, content of which in this context is hereby incorporated by reference in the present invention.

The isotridecanol on which the alcohol component is based (isotridecyl alcohol) is of synthetic origin and is prepared by oligomerization of suitable lower olefin building blocks and subsequent oxo synthesis (hydroformylation). Thus, isobutylene, 1-butylene, 2-butylene or mixtures thereof can be catalytically trimerized, propylene can be catalytically tetramerized or 2-methyl-1-pentene can be catalytically dimerized. The $C_{12}$-olefins thus obtainable are then converted into the homologous $C_{13}$-alcohol, for example by means of CO and $H_2$ over a suitable catalyst.

The main amount of the isotridecanol consists of primary $C_{13}$-alkanols having at least 3, in particular 4, branches (alkyl side chains). As a rule, they are tetramethylnonanols, e.g. 2,4,6,8-tetramethyl-1-nananol or 3,4,6,8-tetramethyl-1-nonanol. Ethyldimethylnonanols, such as 5-ethyl-4,7-dimethyl-1-nonanol, may also be present.

However, a suitable parent alcohol component is not only pure isotridecanol but also mixtures of homologs of branched $C_{11}$- to $C_{14}$-alkanols which comprise isotridecanol as the main component. Such mixtures of homologs form under certain conditions in the above-described oligomerization of lower olefin building blocks and subsequent oxo synthesis. A typical composition of such a mixture is the following:

branched $C_{11}$-alkanol (isoundecanol) 2-15% by weight, branched $C_{12}$-alkanol (isododecanol) 15-35% by weight, isotridecanol 55-75% by weight and branched $C_{14}$-alkanol (isotetradecanol) 1-10% by weight.

The "$C_{13}/C_{15}$-oxo alcohols", which are mixtures of corresponding linear olefins, i.e. alpha-dodecene and alpha-tetradecene, which have been hydroformylated, are to be distinguished from the isotridecanol used in the present invention. the $C_{13}$- and $C_{15}$-alkanols obtained are linear and have not more than one branch.

The degrees of alkoxylation x and y which, as a rule, are average values since a random distribution of the alkylene oxide units having a frequency maximum is generally present, are preferably, independently of one another, numbers from 1.5 to 12. By means of special alkoxylation catalysts, for example modified bentonites or hydrotalcites, as described in WO-A 95/04024, the random distribution can be greatly restricted so that narrow-range alkoxylates are obtained.

The block-like isotridecanol alkoxylates (V) described are either ethylene oxide/propylene oxide or butylene oxide adducts of the formula (Va)

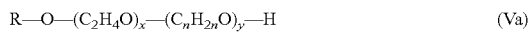

where n=3 or 4 (Va) or propylene oxide or butylene oxide/ ethylene oxide adducts of the formula (Vb)

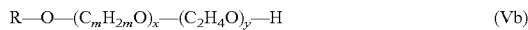

where m=3 or 4 (Vb).

If m or n is the number 3 or 4, the number 3 (propylene oxide block) is preferred.

The ratio of variables x and y, which is one of the decisive factors with regard to the balance between hydrophilic and hydrophobic molecular moieties, is greater than or equal to 1 in the case of the adducts (Va), preferably the ratio of x to y is from 1:1 to 4:1, in particular from 1.5:1 to 3:1.

The ratio of the variables x and y in the case of the adducts (Vb) is somewhat less critical and is as a rule from 1:3 to 3:1, preferably from 1:1.5 to 3:1.

Another suitable class of nonionic surfactants comprises endcapped alcohol alkoxylates, in particular of abovementioned alcohol alkoxylates. In a preferred embodiment, they are the corresponding endcapped alcohol alkoxylates of the alcohol alkoxylates of the general formulae (I) (II), (III) and (V). The endcapping can be effected, for example, with dialkyl sulfate, $C_{1-10}$-alkyl halides, phenyl halides, preferably chlorides or bromides, particularly preferably cyclohexyl chloride, cyclohexyl bromide, phenyl chloride or phenyl bromide.

Examples of endcapped alkoxylates are also described in DE-A 37 26 121, the entire disclosure thereof in this context being hereby incorporated by reference in the present invention. In a preferred embodiment, these alcohol alkoxylates have the general structure (VI)

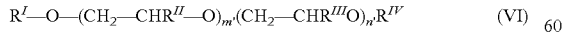

where $R^I$ is hydrogen or $C_1$-$C_{20}$-alkyl, $R^{II}$ and $R^{III}$ are identical or different and, in each case independently of one another, are hydrogen, methyl or ethyl, $R^{IV}$ is $C_1$-$C_{10}$-alkyl, preferably $C_1$-$C_4$-alkyl, or cyclohexyl or phenyl, m' and n' are identical or different and are greater than or equal to 0, with the proviso that the sum of m' and n' is from 3 to 300.

These compounds are prepared by reacting polyoxyalkylene compounds of the formula (VII)

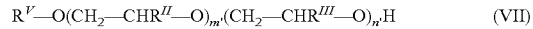

where $R^V$ is hydrogen or $C_1$-$C_{20}$-alkyl and $R^{II}$, $R^{III}$, m' and n' in each case have the abovementioned meaning, with a dialkyl sulfate of the formula (VIII)

$(R^{IV}O)_2SO_2$ (VIII) or a $C_1$-$C_{10}$-alkyl halide, in particular $C_1$-$C_4$-alkyl halide, preferably chloride or bromide, cyclohexyl or phenyl halide, preferably chloride or bromide.

where $R^{IV}$ has the abovementioned meaning, in the presence of an alkali metal hydroxide. The reaction is carried out at a temperature of from 20 to 60° C. in the presence of an aqueous solution of an alkali metal hydroxide, the concentration of alkali metal hydroxide not being permitted to be less than 35% by weight, based on the aqueous phase, during the entire duration of the reaction and at least 1 mol of dialkyl sulfate of the formula (VIII) and at least one mole of alkali metal hydroxide being used per mole equivalent of organic hydroxyl groups. All alkyl groups occurring in the abovementioned formulae (VI), (VII) and (VIII) may be both straight-chain and branched. $R^I$, $R^{IV}$ and $R^V$ are, for example, methyl, ethyl, propyl, isopropyl, butyl, isobutyl or sec-butyl.

$R^I$ and $R^V$ are furthermore, for example, pentyl, isopentyl, sec-pentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl, tetradecyl, pentadecyl, hexadecyl, heptadecyl, octadecyl, nonadecyl or eicosyl (the names isooctyl, isononyl, isodecyl and isotridecyl are trivial names and originate from the alcohols obtained by the oxo synthesis—cf. in this context Ullmann, Enzyklopädie der Technischen Chemie, 4th Edition, Volume 7, pages 215 to 217, and Volume 11, pages 435 and 436).

Preferably used starting materials are polyoxyalkylene derivatives of the formula (VI), where $R^V$ is hydrogen or $C_8$-$C_{16}$-alkyl.

Polyoxyalkylene derivatives of the formula (VII) which are furthermore preferred are those in which the sum of m' and n' is from 3 to 10 or from 50 to 100.

A preferred alkylating agent is a dialkyl sulfate of the formula (VIII), where $R^{IV}$ is ethyl or in particular methyl.

If such polyoxyalkylene derivatives of the formula (VII), where $R^V$ is hydrogen, are used as starting materials, a dietherification is effected. In this case, etherified polyoxyalkylene derivatives of the formula (VI), where $R^I$ is identical to $R^{IV}$, are obtained.

Another class of nonionic surfactants comprises alkylpolyglucosides having preferably 6 to 22, particularly preferably 10 to 18, carbon atoms in the alkyl chain. These compounds generally comprise from 1 to 20, preferably from 1.1 to 5, glucoside units.

Another class of nonionic surfactants comprises N-alkyglucamides of the general structures (IX) and (X)

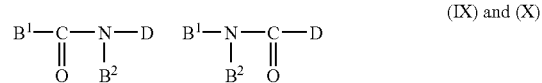

where $B^1$ is a $C_6$- to $C_{22}$-alkyl, $B^2$ is hydrogen or $C_1$- to $C_4$-alkyl and D is a polyhydroxyalkyl radical having 5 to 12 carbon atoms and at least 3 hydroxyl groups. $B^1$ is preferably $C_{10}$- to $C_{18}$-alkyl. $B^2$ is $CH_3$ and D is a $C_5$- or $C_6$-radical. For example, such compounds are obtained by acylation of reductively aminated sugars with acid chlorides of $C_{10}$- to $C_{18}$-carboxylic acids.

Further suitable nonionic surfactants are the endcapped fatty acid amide alkoxylates which are disclosed in WO-A 95/11225 and are of the general formula (XI)

where
$R^1$ is a $C_5$- to $C_{21}$-alkyl or alkenyl radical,
$R^2$ is $C_1$-$C_4$-alkyl group,
$A^1$ is $C_2$- to $C_4$-alkylene,
y is the number 2 or 3 and
x has a value of from 1 to 6.

Examples of such compounds are the reaction products of n-butyltriglyeolamine of the formula $H_2N-(CH_2-CH_2O)_3-C_4H_9$ with methyl dodecanoate or the reaction products of ethyltetraglycolamine of the formula $H_2N-(CH_2-CH_2-O)_4-C_2H_5$ with a commercial mixture of saturated $C_8$- to $C_{18}$-fatty acid methyl esters.

Polyhydroxy- or polyalkoxy-fatty acid derivatives, such as polyhydroxy-fatty acid amides, N-alkoxy- or N-aryloxypoly-hydroxy-fatty acid amides, fatty acid amide ethoxylates, in particular endcapped ones, and fatty acid alkanolamide alkoxylates are furthermore suitable as nonionic surfactants.

Block copolymers of ethylene oxide, propylene oxide an/or butylene oxide (Pluronic® and Tetronic® brands from BASF AG and BASF Corp., respectively) are furthermore suitable as nonionic surfactants. In a preferred embodiment, they are three-block copolymers having polyethylene/polypropylene/polyethylene blocks and a molecular weight of from 4000 to 16 000, the amount by weight of the polyethylene blocks being from 55 to 90%, based on the three-block copolymer. Three-block copolymers having a molecular weight of more than 8000 and a polyethylene content of from 60 to 85% by weight, based on the three-block copolymer, are particularly preferred. These preferred three-block copolymers are commercially available in particular under the names Pluronic F127, Pluronic F108 and Pluronic F98, in each case from BASF Corp., and are described in WO 01/47472 A2, the entire disclosure of which in this context is hereby incorporated by reference in the present invention.

In addition, block copolymers of ethylene oxide, propylene oxide and/or butylene oxide which are blocked at one or both ends can also preferably be used. Blocking at one end is achieved, for example, by using an alcohol, in particular a $C_{1-22}$-alkyl alcohol, for example methanol, as a starting compound for the reaction with an alkylene oxide. In addition, for example, endcapping at both ends can be effected by reaction of the free block copolymer with dialkyl sulfate, $C_{1-10}$-alkyl halides, phenyl halides, preferably chlorides or bromides, particularly preferably cyclohexyl chloride, cyclohexyl bromide, phenyl chloride or phenyl bromide.

Individual nonionic surfactants or a combination of different nonionic surfactants may additionally be used. It is possible to use nonionic surfactants from only one class, in particular only alkoxylated $C_4$- to $C_{22}$-alcohols. Alternatively, however, it is also possible to use surfactant mixtures from different classes.

If an anionic surfactant is used in the composition according to the invention, this may preferably be selected from the group consisting of fatty alcohol sulfates, sulfated alkoxylated alcohols, alkanesulfonates, N-acyl sarcosinates, alkylbenzenesulfonates, olefin sulfonates and olefin disulfonates, alkyl ester sulfates, sulfonated polycarboxylic acids, alkylglyceryl sulfonates, fatty acid glyceryl ester sulfonates, alkylphenol polyglycol ether sulfates, paraffinsulfonates, alkyl phosphates, acyl isothionates, acyl taurates, acylmethyl taurates, alkylsuccinic acids, alkenylsuccinic acids or the monoesters or monoamides thereof, alkylsulfosuccinic acids or the amides thereof, mono- and diesters of sulfosuccinic acids, sulfated alkylpolyglycosides, alkylpolyglycol carboxylates and hydroxyalkyl sarcosinates.

Suitable anionic surfactants are fatty alcohol sulfates or fatty alcohols having, for example, 8 to 22, preferably 10 to 18, carbon atoms, $C_{12}$-$C_{18}$-alcohol sulfates, lauryl sulfate, cetyl sulfate, myristyl sulfate, palmityl sulfate, stearyl sulfate and tallow fatty alcohol sulfate.

Further suitable anionic surfactants are sulfated ethoxylated $C_8$- to $C_{22}$-alcohols (alkyl ether sulfates) or the soluble salts thereof. Compounds of this type are prepared, for example, by first alkoxylating a $C_8$- to $C_{22}$-alcohol, preferably a $C_{10}$- to $C_{18}$-alcohol, e.g. a fatty alcohol, and then sulfating the alkoxylation product. Ethylene oxide is preferably used for the alkoxylation, from 1 to 50, preferably from 1 to 20, mol of ethylene oxide being used per mole of alcohol. The alkoxylation of the alcohols can, however, also be carried out with propylene oxide alone or, if appropriate, butylene oxide. Those alkoxylated $C_8$- to $C_{22}$-alcohols which comprise ethylene oxide and propylene oxide or ethylene oxide and butylene oxide or ethylene oxide and propylene oxide and butylene oxide are also suitable. The alkoxylated $C_8$- to $C_{22}$-alcohols may comprise the ethylene oxide, propylene oxide and butylene oxide units in the form of blocks or in random distribution. Depending on the type of alkoxylation catalyst, alkyl ether sulfates having a broad or narrow alkylene oxide homolog distribution may be obtained.

Further suitable anionic surfactants are alkanesulfonates, such as $C_8$- to $C_{24}$-alkanesulfonates, preferably $C_{10}$- to $C_{18}$-alkanesulfonates, and soaps, such as, for example, sodium and potassium salts of saturated and/or unsaturated $C_8$- to $C_{24}$-carboxylic acids.

Further suitable anionic surfactants are linear $C_8$- to $C_{20}$-alkylbenzenesulfonates ("LAS"), preferably linear $C_9$- to $C_{13}$-alkylbenzenesulfonates and $C_9$- to $C_{13}$-alkyltoluenesulfonates.

$C_8$- to $C_{24}$-olefinsulfonates and -disulfonates, which may also be mixtures of alkene- and hydroxyalkanesulfonates or -disulfonates, alkyl ester sulfonates, sulfonated polycarboxylic acids, alkylglyceryl sulfonates, fatty acid glyceryl ester sulfonates, alkylphenol polyglycol ether sulfates, paraffinsulfonates having about 20 to about 50 carbon atoms (based on paraffin or paraffin mixtures obtained from natural sources), alkyl phosphates, acyl isethionates, acyl taurates, acylmethyl taurates, alkylsuccinic acids, alkenylsuccinic acids or the monoesters or manoamides thereof, alkylsulfosuccinic acids or the amides thereof, mono- and diesters of sulfosuccinic acids, acyl sarcosinates, sulfated alkylpolyglucosides, alkylpolyglycol carboxylates and hydroxyalkyl sarcosinates are furthermore suitable as anionic surfactants.

The anionic surfactants are added to the composition according to the invention preferably in the form of salts. Suitable cations in these salts are alkali metal ions, such as sodium, potassium and lithium, and ammonium salts, such as, for example, hydroxyethylammonium, di(hydroxyethyl)ammonium and tri(hydroxyethyl)ammonium salts.

Individual anionic surfactants or a combination of difference anionic surfactants may be used. It is possible to use anionic surfactants from only one class, for example only fatty alcohol sulfates or only alkylbenzenesulfonates, but it is also possible to use surfactant mixtures from different classes, for example a mixture of fatty alcohol sulfates and alkylbenzenesulfonates.

If a cationic surfactant is used in the composition according to the invention, this is preferably selected from the group consisting of tetraalkylammonium salts, imidazolinium salts and amine oxides.

Furthermore, cationic surfactants as described in WO 99/19435 may be used. Examples are $c_8$- to $C_{16}$-dialkyldimethylammonium salts, dialkoxydimethylammonium salts and imidazolinium salts having a long-chain alkyl radical.

It is possible to use individual cationic surfactants or a combination of different cationic surfactants. It is possible to use cationic surfactants from only one class, but it is also possible to use surfactant mixtures from different classes.

If an amphoteric surfactant is used in the composition according to the invention, it may be selected from the group consisting of the surfactants comprising carboxylic acids, preferably ethylenically unsaturated carboxylic acids, and furthermore at least one ethylenically unsaturated monomer unit of the general formula (XII)

$$R^1(R^2)C=C(R^3)R^4 \qquad (XII),$$

where $R^1$ to $R^4$, independently of one another, are —H, —$CH_3$, a straight-chain or branched saturated alkyl radical having 2 to 12 carbon atoms, a straight-chain or branched, mono- or polyunsaturated alkenyl radical having 2 to 12 carbon atoms, alkyl or alkenyl radicals as defined above which are substituted by —$NH_2$, —OH or —COOH, a heteroatomic group having at least one positively charged group, a quaternized nitrogen atom or at least one amino group having a positive charge in the pH range from 2 to 11 or are —COOH or —COOR$^5$, where $R^5$ is a saturated or unsaturated, straight-chain or branched hydrocarbon radical having 1 to 12 carbon atoms.

Examples of the abovementioned monomer units of the formula (XII) are diallylamine, methyldiallylamine, tetramethylammonium salts, acrylamidopropyl(trimethyl)ammonium salts ($R^1$, $R^2$ and $R^3$=H, $R^4$=C(O)NH(CH$_2$)$_2$N$^+$(CH$_3$)$_3$X$^-$), methacrylamidepropyl(trimethyl)ammonium salts ($R^1$ and $R^2$=H, $R^3$=CH$_3$, H, $R^4$=C(O)NH(CH$_2$)$_2$N$^+$(CH$_3$)$_3$X$^-$).

Particularly preferred amphoteric surfactants comprise, as monomer units, derivatives of diallylamine, in particular dimethyldiallylammonium salt and/or methacrylamidopropyl(trimethyl)ammonium salt, preferably in the form of the chloride, bromide, iodid, hydroxide, phosphate, sulfate, hydrogen sulfate, ethylsulfate, methylsulfate, mesylate, tosylate, formate or acetate, in combination with monomer units from the group consisting of the ethyleneically unsaturated carboxylic acids.

It is possible to use individual amphoteric surfactants or a combination of different amphoteric surfactants.

Moreover, it is possible in the context of the present invention to use surfactants of different classes, for example anionic surfactants with cationic surfactants, amphoteric surfactants with nonionic surfactants, etc., in the composition according to the invention. Surfactants from one, two, three or four different surfactant classes (nonionic, anionic, cationic and amphoteric) may be used.

In a preferred embodiment, the sulfuric acid used is dilute sulfuric acid having a content of from 1 to 80 g/l of $H_2SO_4$, particularly preferably from 2 to 60 g/l of $H_2SO_4$, in particular of from 5 to 40 g/l of $H_2SO_4$. In a further preferred embodiment, particularly if the composition according to the invention is used for the pretreatment of the copper-containing starting materials, the sulfuric acid used is concentrated sulfuric acid having a content of, preferably, from 25 to 500 g/l of $H_2SO_4$, particularly preferably from 50 to 400 g/l of $H_2SO_4$, in particular from 75 to 300 g/l of $H_2SO_4$.

The composition according to the invention can, if appropriate, comprise further additives for metal extraction which are known per se to the person skilled in the art. An example of this comprises iron(III) ions for copper extraction, preferably in a concentration of 5 to 50 based on the composition according to the invention. The iron(III) ions are preferably used in the form of iron(III) sulfate in the composition according to the invention. Further suitable additives are, for example, additives which stabilize $Ca^{2+}$ ions which often occur in association with copper. Examples of these are sodium polyacrylates. Further suitable additives are aluminum ions.

The present invention furthermore relates to an aqueous composition which comprises sulfuric acid and at least one surfactant, the surfactant being selected from the group consisting of the group of the nonionic surfactants, the nonionic surfactants being selected from the group consisting of alcohol alkoxylates, alkylphenol alkoxylates, alkylpolyglucosides, N-alkylpolyglucosides, N-alkylglucamides, fatty acid alkoxylates, fatty acid polyglycol esters, fatty acid amine alkoxylates, fatty acid amide alkoxylates, fatty acid alkanolamide alkoxylates, N-alkoxypolyhydroxy-fatty acid amides, N-aryloxypolyhydroxy-fatty acid amides, block copolymers of ethylene oxide, propylene oxide and/or butylene oxide, polyisobutene alkoxylates, polyisobutene/maleic anhydride derivatives, fatty acid glycerides, sorbitan esters, polyhydroxy-fatty acid derivatives, polyalkoxy-fatty acid derivatives and bisglycerides;

the group of the anionic surfactants, the anionic surfactants being selected from the group consisting of fatty alcohol sulfates, sulfated alkoxylated alcohols, alkanesulfonates, N-acyl sarcosinates, alkylbenzenesulfonates, olefin sulfonates and olefin disulfonates, alkyl ester sulfonates, sulfonated polycarboxylic acids, alkylglyceryl sulfonates, fatty acid glyceryl ester sulfonates, alkylphenol polyglycol ether sulfates, paraffin-sulfonates, alkyl phosphates, acyl isothionates, acyl taurates, acylmethyl taurates, alkylsuccinic acids, alkenylsuccinic acids or the monoesters or monoamides thereof, alkylsulfosuccinic acids or the amides thereof, mono- and diesters of sulfosuccinic acids, sulfated alkylpolyglycosides, alkylpolyglycol carboxylates and hydroxyalkyl sarcosinates;

the group of the cationic surfactants, the cationic surfactants being selected from the group consisting of tetraalkylammonium salts, imidazolinium salts and amine oxides;

the group of the amphoteric surfactants, the amphoteric surfactants being selected from the group consisting of surfactants comprising carboxylic acids and furthermore at least one ethylenically unsaturated monomer unit of the formula (XII)

$$R^1(R^2)C=C(R^3)R^4 \qquad (XII)$$

where $R^1$ to $R^4$, independently of one another, are —H, —$CH_3$, a straight-chain or branched saturated alkyl radical having 2 to 12 carbon atoms, a straight-chain or branched, mono- or polyunsaturated alkenyl radical having 2 to 12 carbon atoms, alkyl or alkenyl radicals as defined above and substituted by —$NH_2$, —OH or —COOH, a heteroatomic group having at least one positively charged group, a quaternized nitrogen atom or at least one amino group having a positive charge in the pH range from 2 to 11, or is —COOH or —COOR$^5$, where R$^5$ is a saturated or unsaturated, straight-chain or branched hydrocarbon radical having 1 to 12 carbon atoms.

The present invention furthermore relates to a process for extracting metals from metal-containing starting materials.

This may be the extraction of copper from preferably copper-poor ores and waste products having a copper content of from, preferably, less than 3%, preferably less then 2%, particularly less than 1%. the waste product may be, for example, the copper-containing calcined pyrites product obtained in sulfuric acid production.

In addition, the process according to the invention is also suitable for extracting copper from copper-containing oxides, sulfides, arsenides, chlorides and carbonates. The most important sulfidic copper ores are chalkopyrite $CuFeS_2$ (="$Cu_2S \cdot Fe_2S_3$"), peacock ore (bornite) $Cu_3FeS_3$ (="$3Cu_2S \cdot Fe_2S_3$"), cubanite $CuFe_2S_3$ and copper glance (chalcocite) $Cu_2S$. Among the oxidic ores, red copper ore (cuprite) $Cu_2O$, the green malachite $Cu_2(OH)_2(CO_3)$ (="$CuCO_3 \cdot Cu(OH)_2$") and blue copper ore (azurite) $Cu_3(OH)_2(CO_3)_2$(="$2CuCO_3 \cdot Cu(OH)_2$") may be mentioned.

In addition, the process according to the invention is also suitable for extracting copper from copper-poor ores and waste products having a copper content of generally less than 2%. Such waste products are obtained as copper-containing calcined pyrites product, for example in sulfuric acid production.

The process according to the invention then comprises the following process steps:
(a) provision of an optionally milled metal-containing material,
(b) provision of a composition according to the invention and
(c) bringing of the metal-containing material into contact with the above-described composition according to the invention, a mother liquor enriched with metal being obtained.

Bringing the metal-containing material into contact with the composition according to the invention is preferably understood as meaning that the metal-containing material is heaped up and then the composition according to the invention percolates or trickles through the heaped material. The spraying of the metal-containing material is preferably effected dropwise. After separation of the metal from the composition, this is preferably used again for further extraction processes.

In a preferred embodiment, the metal-containing material is first milled before the metal extraction so that particles having a diameter of about 10 cm are obtained. The surfactant provided according to the invention can be added during the milling process itself. The milled particles are then heaped up, usually heaps comprising from 100 000 to 500 000 metric tons of starting material being formed. These are then—as described above—extracted with the aid of the composition according to the invention.

It should be expressly pointed out that the compositions according to the invention can be applied in different concentration ranges during the extraction process (gradient procedure). In addition, the surface-active substances (as part of the composition) can be added partly or completely even before the beginning of the extraction process to the starting material or rock, for example during milling of the material.

According to the invention, the amount of nonionic surfactant used is from 1 to 30 ppm, preferably from 1 to 20 ppm, particularly preferably from 2 to 15 ppm, in particular from 3 to 10 ppm, per metric ton of starting material. It has proven to be advantageous to use a higher concentration at the beginning of the extraction process than before the end of the extraction.

Depending on the starting material to be extracted, it may also be preferable if the starting material to be extracted is first pretreated with a concentrated sulfuric acid for wetting and thereafter the extraction of the metal with a dilute sulfuric acid is effected. Such a procedure is recommended, for example, by U.S. Pat. No. 4,091,070 for copper extraction, the disclosure of which in this context is hereby incorporated by reference into the present invention. In the context of the present invention, the at least one surfactant provided according to the invention can be added to the concentrated and the dilute sulfuric acid. Alternatively, however, it is also possible for the surfactant to be added only to the concentrated or only to the dilute sulfuric acid.

If a concentrated sulfuric acid is used for the pretreatment (wetting) the concentration thereof is preferably from 25 to 500 g/l of $H_2SO_4$, particularly preferably from 50 to 400 g/l of $H_2SO_4$, in particular from 75 to 300 g/l of $H_2SO_4$.

If copper is to be extracted as the metal, a further pretreatment suitable in the context of the present invention for the copper-containing starting material to be extracted is roasting. This is preferably effected by heating in so-called roasting furnaces, for example rotary kilns, multiple-deck furnaces or fluidized-bed roasting furnaces, with admission of air. In general, metal sulfides, arsenides and antimonides of copper and associated metals are converted into the corresponding oxides.

In a preferred embodiment, the metal can be removed from the resulting aqueous mother liquor by extracting with a complexing agent soluble in an organic medium. For this purpose, for example, organic soluble complexing agents from Cognis (Lix® types) and Cytec can be used. These are preferably 2-hydroxy-5-nonylacetophenone oxime, which is used in an organic solution (Shellsol®). Thereafter, the copper is transferred from the organic solution preferably by means of aqueous sulfuric acid, into an aqueous, preferably strongly acidic phase and is obtained therefrom by an electrochemical method. These procedures are known per se to the person skilled in the art and are described, for example, in U.S. Pat. No. 4,120,935 and U.S. Pat. No. 4,091,070, the disclosure of which in this context is hereby incorporated by reference in the present invention.

Alternatively, in the case of copper extraction, the extracted copper can also be precipitated by means of iron scrap from the mother liquor obtained in the process according to the invention. This procedure, which is generally referred to as "carburization", is known per se to the person skilled in the art. The carburization is usually followed by melting of the extracted copper and electrolytic purification.

As already mentioned, particularly preferred surfactants are those which remain in the aqueous sulfuric acid-containing phase during the extraction of the aqueous sulfuric acid-containing mother liquor with the organic complexing agent. In a preferred embodiment of the present invention, the aqueous sulfuric acid-containing solution which contains the at least one surfactant can therefore be used for further extraction passes. It is thus possible to avoid having to add fresh surfactant after each extraction pass. Such recycling is advantageous in particular for economic reasons.

In a further embodiment of the present invention, it is also possible to apply the surfactant provided according to the invention independently of the aqueous sulfuric acid-containing solution, for example as a separate aqueous solution, to the material to be extracted. This can be effected preferably immediately before, after or during the application of the aqueous sulfuric acid-containing solution. Depending on the copper-containing material to be extracted, it may be sufficient if the surfactant provided according to the invention is used only in the first passes of the extraction, while thereafter the amount of surfactant used can be gradually reduced (gradient procedure) or the surfactant addition can be dispensed with.

The extraction of the metal-containing starting material is generally carried out until the content of extracted metal is less than 1 g/l. Periods of from five days to several months are customary for this purpose, depending on the type of material to be extracted and the amount thereof.

The present invention furthermore relates to the use of surfactants which, in a concentration of from 0.01 to 0.3% by weight, preferably from 0.05 to 0.25% by weight, in particular from 0.1 to 0.2% by weight, in a 2% strength aqueous $H_2SO_4$ solution, at 23° C., lead to a reduction in the contact angle on glass after 1 second, particularly preferably after 0.5 second, in particular after 0.1 second, by at least 10°, particularly preferably at least 20°, in particular at least 30°, especially at least 40°, for extracting metal from metal-containing materials, preferably for extracting copper from copper-containing materials. For further features, reference is made to the above-described composition according to the invention.

In addition, the present invention relates to the use of surfactants for metal extraction from metal-containing materials, in particular for extracting copper from copper-containing materials, the surfactants being selected from the group consisting of
- the group of nonionic surfactants, the nonionic surfactants being selected from the group consisting of alcohol alkoxylates, alkylphenol alkoxylates, alkylpolyglucosides, N-alkylpolyglucosides, N-alkylglucamides, fatty acid alkoxylates, fatty acid polyglycol esters, fatty acid amine alkoxylates, fatty acid amide alkoxylates, fatty acid alkanolamide alkoxylates, N-alkoxypolyhydroxy-fatty acid amides, N-aryloxypolyhydroxy-fatty acid amides, block copolymers of ethylene oxide, propylene oxide and/or butylene oxide, polyisobutene alkoxylates, polyisobutene/maleic anhydride derivatives, fatty acid glycerides, sorbitan esters, polyhydroxy-fatty acid derivatives, polyalkoxy-fatty acid derivatives and bisglycerides;
- the group of the anionic surfactants, the anionic surfactants being selected from the group consisting of fatty alcohol sulfates, sulfated alkoxylated alcohols, alkanesulfonates, N-acyl sarcosinates, alkylbenzenesulfonates, olefin sulfonates and olefin disulfonates, alkyl ester sulfonates, sulfonated polycarboxylic acids, alkylglyceryl sulfonates, fatty acid glyceryl ester sulfonates, alkylphenol polyglycol ether sulfates, paraffinsulfonates, alkyl phosphates, acyl isothionates, acyl taurates, acylmethyl taurates, alkylsuccinic acids, alkenylsuccinic acids or the monoesters or monoamides thereof, alkylsulfosuccinic acids or the amides thereof, mono- and diesters of sulfosuccinic acids, sulfated alkylpolyglycosides, alkylpolyglycol carboxylates and hydroxyalkyl sarcosinates;
- the group of the cationic surfactants, the cationic surfactants being selected from the group consisting of tetraalkylammonium salts, imidazolinium salts and amine oxides;
- the group of the amphoteric surfactants, the amphoteric surfactants being selected from the group consisting of surfactants comprising carboxylic acids and furthermore at least one ethylenically unsaturated monomer unit of the formula (XII)

$$R^1(R^2)C=C(R^3)R^4 \qquad (XII)$$

where $R^1$ to $R^4$, independently of one another, are —H, —$CH_3$, a straight-chain or branched saturated alkyl radical having 2 to 12 carbon atoms, a straight-chain or branched, mono- or polyunsaturated alkenyl radical having 2 to 12 carbon atoms, alkyl or alkenyl radicals as defined above and substituted by —$NH_2$, —OH or —COOH, a heteroatomic group having at least one positively charged group, a quaternized nitrogen atom or at least one amino group having a positive charge in the pH range from 2 to 11, or is —COOH or —$COOR^5$, where $R^5$ is a saturated or unsaturated, straight-chain or branched hydrocarbon radical having 1 to 12 carbon atoms.

In addition, the present invention relates to the use of surfactants for purifying earth-like materials, for example contaminated soils. Particularly suitable for this purpose are surfactants which, in a concentration of from 0.01 to 0.2% by weight, particularly preferably from 0.01 to 0.1% by weight, in particular from 0.01 to 0.05% by weight, in an aqueous solution adjusted to pH of from 9.8 to 10.2 with NaOH, at 23° C., lead to a reduction in the contact angle on glass after 1 second, particularly preferably after 0.5 second, by at least 10°, particularly preferably at least 20°, in particular at least 30°, especially at least 40° C. Suitable surfactants belong to the classes of the nonionic, anionic, cationic and amphoteric surfactants.

The present invention is further illustrated by the followings examples.

Determination of the Contact Angle:

The contact angle was measured with a video based high velocity measuring instrument for contact angle determination of the type OCAH 200 of the company Dataphysics Instruments GmbH, Raiffeisenstraße 34, Filderstadt, on an extra-white glass slide from Gerhard Menzel Glasbearbeitungswerk GmbH & Co. KG, Braunschweig. The surfactants or surfactant combinations according to the invention listed in Table 1 are used in a 2% aqueous solution of sulphuric acid at the concentration (% by weight) listed in Table 2. The contact angel is determined at 23° C. one second after application. Under these conditions the contact angle of the 2% sulphuric acid without added surfactant is 50°. Accordingly, examples not according to the invention are listed in Table 3. The statements regarding the ethylene oxide (EO) or propylene oxide (PO) content are to be understood as molar, based on 1 mol of alcohol (Table 1). The alkoxylation was carried out block wise in the indicated order or by random/mix.

Column Tests

Column tests, where representative samples of the copper containing rocks are packed into columns and extracted with diluted solutions of sulfuric acid, are used a model for the industrially carried out heap leaching.

The addition of surfactants according to the invention results in an increase of the copper yield and/or improved kinetics of the leaching.

To check the improved efficacy of the claimed compositions of containing surfactants, aqueous solutions of 2% sulfuric acid containing 50-200 ppm surfactant were used in comparison to the respective solution containing no surfactant. Leaching was carried out for 30 days under continuous or discontinuous addition or surfactant at a flow rate of 140 ml/day per kg ore.

The columns had an inner diameter of 28 cm, a length of 100 cm and were filled with approximately 90 kg of ore. The ore was ground to a particle size x of from $0.2 \leq x \leq 2, 5$ cm and sieved. The copper content was 0.5-1.5 g/t of rock. Ores from the mine Mineria El Abra, Calama, II Region, Chile (samples taken in February and September 2005) were used. The results are summarized in Table 4.

The cumulated %-values of the copper yield refer to the total copper content of the respective column. The copper content was determined by ICP-OES (Inductively coupled Plasma—Optical Emission Spectroscopy) on a Vista MPX of the company Varian, Inc., Darmstadt.

TABLE 1

| Surfactant system Example No. | Chemical Composition |
|---|---|
| 1 | $C_{10}$ Guerbet-alcohol + 1.2 PO + 4.8 EO |
| 2 | $C_{10}$ Guerbet-alcohol + 2.5 PO + 6.0 EO (Random/Mix) |
| 3 | $C_{10}$ Guerbet-alcohol + 6.7 + 6.5 PO (Random/Mix) |
| 4 | $C_9C_{11}$ oxo-alcohol + 7 EO + 1.5 BuO |
| 5 | Iso-$C_{10}$ oxo-alcohol + 10 EO + 1.6 penteneoxide |
| 6 | $C_{13}$-$C_{15}$ oxo-alcohol + 6.1 EO + 3.2 PO, end groups capped with DMS (dimethylsulfate) |
| 7 | $C_{13}$ oxo-alcohol + 5.8 EO + 2.5 EO |
| 8 | $C_{13}$ oxo-alcohol + 8 EO |
| 9 | $C_{13}$ oxo-alcohol + 10 EO |
| 10 | Iso-$C_{10}$-oxo-alcohol + 10 EO + 1.6 penteneoxide/n-hexanol + 5 EO 60/30 wt.-% |
| 11 | $C_{13}C_{15}$ oxo-alcohol + 6.1 EO + 3.3 PO, end groups capped with DMS (dimethylsulfate)/44PO + 38EO 60/35 wt.-% |
| 12 | Pluronic ® PE 6400 (PO-EO-blockpolymer, BASF AG Ludwigshafen) |
| 13 | Pluronic ® PE 6800 (PO-EO-blockpolymer, BASF AG Ludwigshafen) |
| 14 | Emulan ® HE 50 (alcoholethoxylate, BASF AG Ludwigshafen) |
| 15 | Plurafac ® LF 403 (falty alcoholethoxylate, BASF AG Ludwigshafen) |
| 16 | Lutensol ® AT 11 ($C_{16}C_{18}$ falty alcoholethoxylate, BASF AG Ludwigshafen) |
| 17 | Texapon ® NSO (aqueous solution, laurylethersulfate Na-salt, Cognis, Dusseldorf) |

TABLE 2

| Surfactant system Example No. | Wt.-% in aqueous 2% sulfuric acid | Contact angle after 1 sec at 23° C. |
|---|---|---|
| 1 | 0.15 | 19 |
| 1 | 0.25 | 26 |
| 2 | 0.10 | 12 |
| 2 | 0.30 | 08 |
| 3 | 0.10 | 10 |
| 4 | 0.10 | 17 |
| 5 | 0.15 | 12 |
| 6 | 0.15 | 18 |
| 6 | 0.10 | 19 |
| 7 | 0.15 | 11 |
| 7 | 0.25 | 15 |
| 8 | 0.15 | 28 |
| 9 | 0.20 | 29 |
| 9 | 0.30 | 25 |
| 10 | 0.15 | 13 |
| 10 | 0.20 | 11 |
| 10 | 0.30 | 07 |
| 11 | 0.25 | 17 |

TABLE 3

| Surfactant system Example | Wt.-% in aqueous 2% sulfuric acid | Contact angle after 1 sec at 23° C. |
|---|---|---|
| 12 | 0.25 | 49 |
| 13 | 0.25 | 45 |
| 14 | 0.30 | 44 |
| 15 | 0.25 | 47 |
| 16 | 0.25 | 48 |
| 17 | 0.30 | 45 |

TABLE 4

| Surfactant system Example No. | Concentrate ppm | Cumulated Cu yield [%] after | | | | Remark |
| | | 5 Days | 10 Days | 20 Days | 30 Days | |
|---|---|---|---|---|---|---|
| — | — | 65 | 72.5 | 74 | 74.5 | El Abra, February 2005 |
| 1 | 50 | 67 | 73 | 76 | 77.5 | Continuous addition of surfactant |
| 1 | 200 | 68 | 73.5 | 74.5 | 78.5 | 7 days, then without addition of surfactant |
| 2 | 50 | 69.5 | 74 | 77 | 78 | Continuous addition of surfactant |
| 2 | 150 | 70.5 | 77 | 77.5 | 77.5 | 10 days, then without addition of sufactant |
| 3 | 50 | 66 | 74 | 76.5 | 78.5 | Continuous addition of surfactant |
| 4 | 40 | 67 | 74 | 75 | 76.5 | 10 days, then without addition of surfactant |
| — | — | 68 | 74 | 78 | 78.5 | El Albra, September 2005 |
| 11 | 50 | 69 | 75 | 79 | 80.5 | Continuous addition of surfactant |
| 10 | 50 | 70 | 76 | 79.5 | 81 | Continuous addition of surfactant |
| 7 | 30 | 71 | 77 | 80 | 81.5 | Continuous addition of surfactant |

We claim:

1. An aqueous composition which comprises sulfuric acid and at least one surfactant, wherein the surfactant, in a concentration of from 0.1 to 0.3% by weight in a 2% strength aqueous $H_2SO_4$ solution, at 23° C., leads to a reduction in the contact angle on glass after 1 second by at least 10°, wherein the composition has a contact angle on glass of less than 40°, and the surfactant is a nonionic surfactant selected from the group consisting of an alcohol alkoxylate, an alkylpolyglucoside, an N-alkylpolyglucoside, an N-alkylglucamide, a fatty acid alkoxylate, a fatty acid polyglycol ester, a fatty acid amine alkoxylate, a fatty acid amide alkoxylate, a fatty acid alkanolamide alkoxylate, an N-alkoxypolyhydroxy-fatty acid amide, an N-aryloxypolyhydroxy-fatty acid amide, a block copolymer of ethylene oxide, a propylene oxide and/or a butylene oxide, a polyisobutene alkoxylate, a polyisobutene/maleic anhydride derivative, a fatty acid glyceride, a sorbitan ester, a polyhydroxy-fatty acid derivative, a polyalkoxy-fatty acid derivative and a bisglyceride, wherein said alcohol alkoxylate is an alcohol alkoxylate of formula (I):

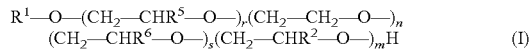
$$R^1—O—(CH_2—CHR^5—O—)_r(CH_2—CH_2—O—)_n(CH_2—CHR^6—O—)_s(CH_2—CHR^2—O—)_mH \quad (I)$$

where $R^1$ is at least singly branched $C_{4-22}$-alkyl, $R^2$ is $C_{3-4}$-alkyl, $R^5$ is $C_{1-4}$-alkyl, $R^6$ is methyl or ethyl, n has a mean value of from 1 to 50, m has a mean value of from 0 to 20, r has a mean value of from 0 to 50, s has a mean value of from 0 to 50, and m being at least 0.5 if $R^5$ is methyl or ethyl or r has the value 0.

2. The aqueous composition according to claim 1, wherein the nonionic surfactant is an alcoxylated $C_4$-$C_{22}$-alcohol.

3. The aqueous composition according to claim 1, wherein in formula (I) m has a mean value of from 0.5 to 20.

4. The aqueous composition according to claim 1, wherein the nonionic surfactant is an alcohol alkoxylate of formula (I).

5. The aqueous composition according to claim 4, wherein the alcohol alkoxylate of formula (I) is of formula (II):

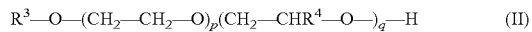
$$R^3—O—(CH_2—CH_2—O)_p(CH_2—CHR^4—O—)_q—H \quad (II)$$

where $R^3$ is branched or straight-chain $C_{4-22}$-alkyl, $R^4$ is $C_{3-4}$-alkyl, p has a mean value of from 1 to 50, and q has a mean value of from 0.5 to 20.

6. The aqueous composition according to claim 5, wherein in formula (II) p has a mean value of from 4 to 15.

7. The aqueous composition according to claim 5, wherein in formula (II) q has a mean value of from 0.5 to 4.

8. The aqueous composition according to claim 5, wherein in formula (II) q has a mean value of from 0.5 to 2.

9. A process for extracting metal from metal-containing materials, comprising the following process steps:

(a) provision of an optionally milled metal-containing material, (b) provision of a composition according to claim 1, and (c) bringing of the metal-containing material into contact with the composition according to claim 1, a mother liquor enriched with metal being obtained.

10. The process according to claim 9, which serves for the extracting of copper.

11. The process according to claim 10, wherein the copper is transferred from the resulting aqueous mother liquor into an organic phase by extraction with a complexing agent soluble in an organic medium, and the copper is then transferred from the organic solution by means of sulfuric acid into an aqueous phase and is obtained therefrom by an electrochemical method.

\* \* \* \* \*